United States Patent
Na

(10) Patent No.: US 11,401,000 B2
(45) Date of Patent: Aug. 2, 2022

(54) BICYCLE PROPELLING DEVICE

(71) Applicant: Pil Su Na, Suwon-si (KR)

(72) Inventor: Pil Su Na, Suwon-si (KR)

( * ) Notice: Subject to any disclaimer, the term of this patent is extended or adjusted under 35 U.S.C. 154(b) by 297 days.

(21) Appl. No.: 16/639,045

(22) PCT Filed: Oct. 10, 2018

(86) PCT No.: PCT/KR2018/011860
§ 371 (c)(1),
(2) Date: Feb. 13, 2020

(87) PCT Pub. No.: WO2019/074261
PCT Pub. Date: Apr. 18, 2019

(65) Prior Publication Data
US 2020/0223512 A1    Jul. 16, 2020

(30) Foreign Application Priority Data
Oct. 12, 2017  (KR) .................. 10-2017-0132599

(51) Int. Cl.
*B62M 1/28*    (2013.01)
*B62M 1/10*    (2010.01)
*B62M 1/12*    (2006.01)

(52) U.S. Cl.
CPC .............. *B62M 1/28* (2013.01); *B62M 1/105* (2013.01); *B62M 1/12* (2013.01)

(58) Field of Classification Search
CPC .............. B62M 1/12; B62M 1/14; B62M 1/16
See application file for complete search history.

(56) References Cited

U.S. PATENT DOCUMENTS 5,429,379 A * 7/1995 Grigoriev ................ B62M 1/12
280/212

FOREIGN PATENT DOCUMENTS

| CA | 2737633 A1 | * | 10/2012 | ............. B62K 3/002 |
|---|---|---|---|---|
| CN | 106741531 A | * | 5/2017 | |
| CN | 107651089 A | * | 2/2018 | |
| JP | H08-183491 A | | 7/1996 | |
| KR | 20-0199382 Y1 | | 10/2000 | |
| KR | 20-0351548 Y1 | | 5/2004 | |
| KR | 10-2005-0031092 A | | 4/2005 | |
| KR | 20110041086 A | * | 4/2011 | |
| KR | 20170142720 A | * | 12/2017 | |

(Continued)

*Primary Examiner* — Kevin Hurley
(74) *Attorney, Agent, or Firm* — KORUS Patent, LLC; Seong Il Jeong

(57) ABSTRACT

The present invention relates to a bicycle propelling device capable of transferring power to a bicycle wheel by using the gripping force of both hands. The present propelling device uses the gripping force, and thus overcomes the problem of prior art hand and foot bicycles in which balance is easily lost during driving because the prior art hand and foot bicycles require the use of the arms. The propelling device can be used together with a pedaling operation when greater power is required while the user is riding the bicycle as usual, thereby improving the running efficiency of the bicycle. Furthermore, the propelling device is formed by combining simple devices including a string and a freewheel, and thus a bicycle can maintain the original structure thereof as it is, so that it does not cause any disadvantage or difference when the user rides the bicycle by stepping on pedals in a conventional manner.

10 Claims, 4 Drawing Sheets

(56) References Cited

FOREIGN PATENT DOCUMENTS

| KR | 20180017968 A | * | 2/2018 | | |
|----|---------------|---|--------|---|---|
| WO | WO-2009025519 A2 | * | 2/2009 | ............. | B62K 3/002 |
| WO | WO-2017222209 A1 | * | 12/2017 | ............. | B62M 1/12 |

\* cited by examiner

BICYCLE PROPELLING DEVICE

TECHNICAL FIELD

The present invention relates to a bicycle propelling device, and more specifically to a device that is capable of propelling a bicycle by using the gripping force of both hands together with the operation of stepping on pedals.

BACKGROUND ART

In general, bicycles obtain propelling power in such a manner that the pedals thereof are stepped on by using the force of the legs. When users ride bicycles, there are many cases in which the legs become tired and power lacks. Accordingly, in order to mitigate the above problem, there have been developed hand and foot bicycles in which people can generate power by using the force of the arms together with the force of the legs. However, these hand and foot bicycles are not commonly used by many people, except for some cases that are used for special purposes.

An important reason why the conventional hand and foot bicycles could not succeed is that orientation control cannot be performed simultaneously. When riding a bicycle, the force of the arms is rarely used, but the arms play a very important role. The arms constantly control orientation every moment, and thus a bicycle does not fall and stays in balance. In the conventional hand and foot bicycles, power is generated with the arms, and thus a critical problem occurs in that the bicycles do not stay in balance because orientation control cannot be performed simultaneously. It is impossible to simultaneously and freely perform the operation of generating power by using the arms and another operation of controlling orientation, which is a limitation of all the prior art hand and foot bicycles using the force of the arms.

In all the prior art hand and foot bicycles, it is impossible to control orientation simultaneously, and thus there occurs the problem of losing balance and falling down. In order to overcome this problem, there are three-wheel bicycles, but the driving of these three-wheeled bicycles is not as smooth as that of two-wheeled bicycles. Furthermore, there are products that allowing orientation to be controlled while allowing both arms to be rotated. However, it is very difficult to control orientation, and thus an experienced person like a professional player can ride them. It is possible to ride them on tracks having constant orientation. Moreover, there are cases where orientation is controlled by using the center of the body. These inventions do not completely overcome the limitations to the control of orientation, and are more inconvenient and dangerous than the conventional bicycles.

Technologies, such as KR 10-2005-0031092 A, KR 20-0199382 Y1, and KR 87-5183 U, were proposed as prior arts for obtaining power by using the arms and the feet.

However, it is difficult for the prior art hand and foot bicycles to stay in balance because power is generated by the force of the arms, and changes in shape and structure occur and cause the loss of original characteristics of conventional bicycles.

Another reason why the prior art bicycles could not succeed is that the conventional bicycles are simple and harmonious. In the conventional bicycles, power is generated by stepping on pedals with the legs, and the handle is adjusted with both arms. The division of the roles of the arms and legs is harmonized and the minimized structure reduces weight and increases the efficiency of the machine. If the function of transferring power by means of the arms is added to the structure, the structure inevitably becomes complicated in structure and increases in weight. In this situation, it would be very difficult to develop such a hand and foot bicycle to have a comparative advantage over the conventional bicycles.

The present invention uses the gripping force of both hands, not the force of the arms, in order to solve the problem in which it is difficult to stay in balance during driving in the attempts of the prior art hand and foot bicycles. That is, the prior art hand and foot bicycles have a structure in which the legs press pedals and both arms control a handle as in the conventional bicycles and in which only additional power is generated by using the gripping force of both hands when necessary. The hands and the arms are parts of the body that can move differently, and gripping force is available regardless of the movement of the arms. Accordingly, when additional power is generated by using gripping force, it is possible to solve the problem of losing the balance that occurs in the conventional hand and foot bicycle.

In the conventional bicycles, the gripping force of both hands is used to hold a brake. A pair of lever mechanisms for generating gripping force are installed along with brake levers. Both hands are used both to grip a brake and to generate additional power. A case where the brake levers are pressed corresponds to a case where speed is reduced, and a case where the lever mechanisms are pressed corresponds to a case where speed is increased by generating power. That is, since these cases have a time difference, there does not occur the problem of having to press the lever mechanisms while pressing the brake levers. This is equivalent to having an accelerator pedal and a brake pedal next to each other in a car and using them with one foot.

Gripping force is used to apply a brake in a bicycle, and strong gripping force is not required in daily life. Because of this, it may not be easy to think that gripping force can be used to generate the driving force of a bicycle. However, in normal use, the one-hand gripping force of a man reaches more than 50 kg. In the present invention, in order to increase the efficiency of gripping force, the gripping force of both hands other than one hand is used. Since the forces of both hands are combined together, more than 100 kg of power can be generated, which is as strong as the stepping force of the feet. In the present invention, in order to combine the gripping forces of both hands together, strings connected to a pair of lever mechanisms on both sides of a handle may be combined into one, thereby maximizing the magnitude of propelling power.

In the present invention, wire-like strings are employed. They connect lever mechanisms and the mediation member of a wheel shaft, and simply transmit pulling force. These strings allow simple installation without changing the structure of the conventional bicycle, and minimize an increase in weight. The prior art hand and foot bicycles use metal rods in order to transmit power. These metal rods change the structure of the conventional bicycle because they cannot be simply pulled and requires a number of rod parts, thereby causing the original characteristics of the conventional bicycle to be lost and increasing the weight of the bicycle.

DISCLOSURE

Technical Problem

An object of the present invention is to overcome the problem in which it is difficult to maintain balance while increasing the efficiency of traveling by using additional power together with the force of the legs in a conventional bicycle, as described above. Furthermore, additional power is generated by attaching only a simple device without changing the structure of the bicycle and is selectively used only when necessary, so that a user may ride a bicycle in exactly the same manner as the conventional bicycle when not in use. In other words, an object of the present invention is to implement a bicycle that has the advantage of enabling a bicycle propelling device to be installed on the conventional bicycle and to be used in case of need and does not have a difference or disadvantage in teams of riding a bicycle with respect to the conventional bicycle.

The present invention is directed to a device that adds the function of performing propelling by using the gripping force of both hands to the conventional bicycle. An object of the present invention is to enable added power to be selectively used when necessary without causing inconvenience to the function of the conventional bicycle. In the conventional bicycle, a chain is wound and a gear assembly including a free wheel is located on one side of a rear wheel shaft and a certain remaining space is present on the opposite side. In the present invention, a mediation member that is coupled to a rear wheel and includes a free wheel is disposed in the remaining space. When only pedals are used as in the conventional case, inconvenience is not caused to operation as if there were no propelling device because the free wheel in the gear assembly receives force and the free wheel in the mediation member runs idle. In contrast, although this case will not be used frequently, it is possible to propel the bicycle using only the gripping force of both hands without using pedals. In this case, the free wheel in the mediation member receives the force and generates propelling power, but the free wheel in the gear assembly runs idle and does not cause inconvenience to operation. Then, when a user climbs a hill, accelerates a bicycle, or disperses force because the legs are tired, it is possible to repeatedly press the lever mechanisms with both hands while pressing pedals with the legs, thereby doubling propelling power.

In this case, a situation in which both the free wheels receive force simultaneously is repeated, and the forces of the feet and both hands are transmitted together. That is, the bicycle equipped with the present propelling device has the great advantage of selectively obtaining additional power when necessary, but the disadvantage thereof rarely occurs. To this end, in the present propelling device, light and simple strings are employed, the mediation member is disposed in one empty space of the wheel shaft, and the lever mechanisms can be integrated with conventional brake levers, thereby maintaining the appearance and function of the conventional bicycle without change.

Technical Solution

In order to accomplish the above objects, the present invention provides a bicycle propelling device, the bicycle propelling device including: lever mechanisms; strings configured to be pulled by the lever mechanisms; and a free wheel configured to transfer power to a wheel only in one rotation direction as the strings are pulled; wherein the lever mechanisms include at least one of propulsion operation levers hinged to a support rod and configured to pull the strings and rotating elements rotatably disposed on a support rod and configured to pull the strings through rotation.

At least one elastic member configured to perform returning to an original state when force is not applied to the lever mechanisms may be provided in at least any one of the lever mechanisms, the strings, the free wheel, and a mediation member.

A mediation member connected to the strings and configured to move horizontally and to be then engaged with or separated from the free wheel may be disposed on the wheel shaft.

The mediation member may be coupled to the free wheel by the elastic member in normal times, and may be separated from the free wheel of a bicycle by pulling the strings connected to the mediation member during backward driving.

The mediation member may be separated from the free wheel by the elastic member in normal times, may move horizontally while being rotated and be then engaged with the free wheel as the strings are pulled, and may be returned to its original location when the strings are not pulled.

A connection member rotatably coupled to the wheel shaft may be located in the wheel shaft, and a spiral protrusion or spiral groove to be fitted into or over the mediation member may be formed in the connection member.

Advantageous Effects

According to the bicycle propelling device of the present invention, the simple device is added to the process of transferring power to a rear wheel by stepping on pedals with the feet and legs, so that the wheel of a bicycle is propelled by the force of both hands. There is achieved the effect of obtaining additional propelling force in case of need while using the method of riding the conventional general bicycle without a difference. Furthermore, the problem in which a conventional bicycle that is operated by arm force loses balance is overcome by using the force of both hands.

BEST MODE

Preferred embodiments of the present invention will be described in detail below with reference to the accompanying drawings. In this case, it should be noted that like components are designated by like symbols throughout the accompanying drawings as much as possible. Furthermore, detailed descriptions of well-known functions and configurations that may make the gist of the present invention will be omitted. For the same reason, in the accompanying drawings, some components are exaggerated, omitted, or schematically illustrated.

Figure 1:
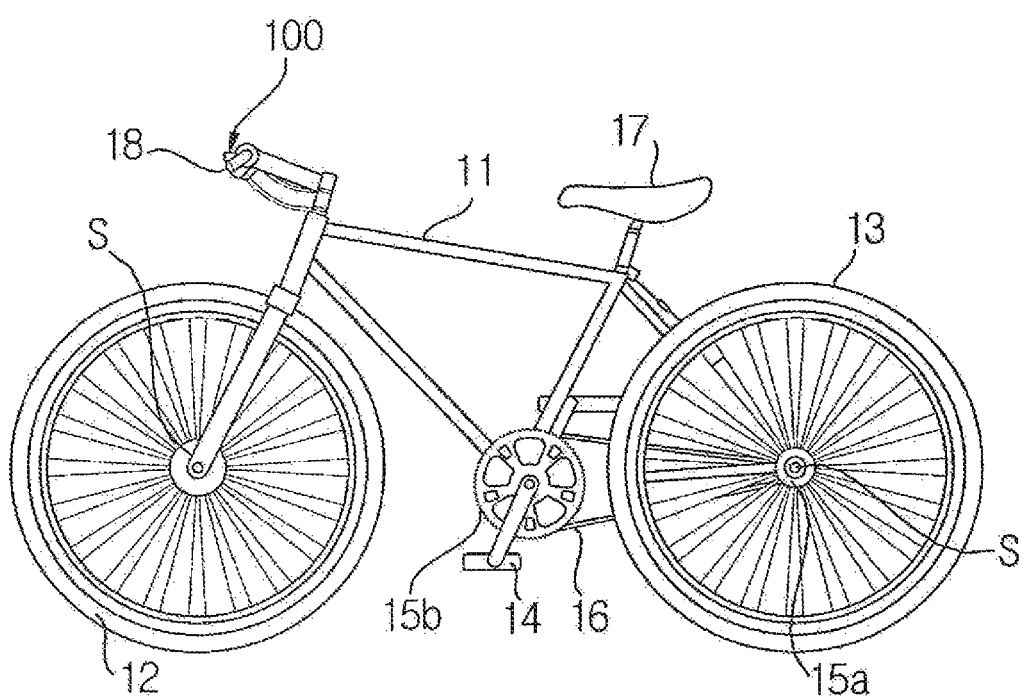
FIG. 1 is a schematic diagram showing a bicycle equipped with a propelling device according to an embodiment of the present invention.
Figure 2:
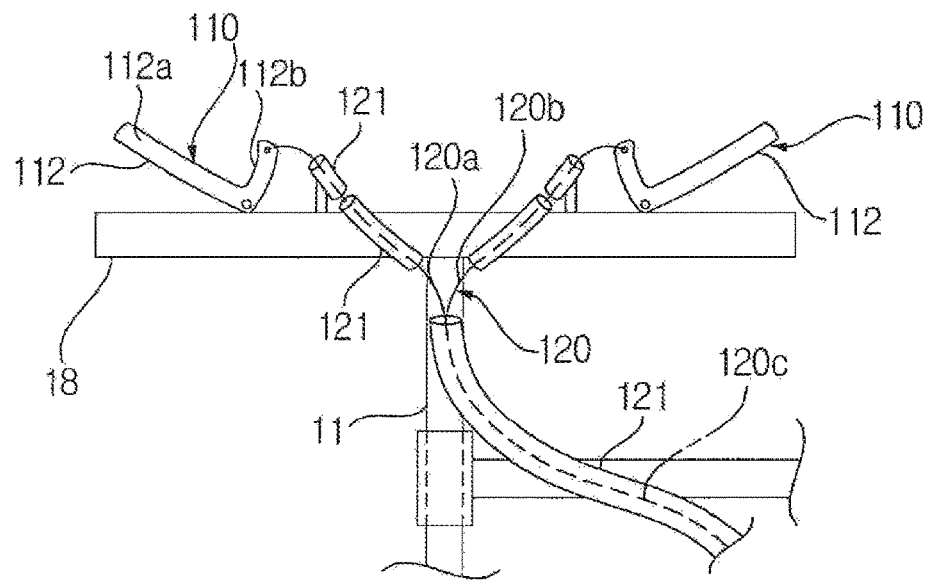
FIG. 2 is a view showing the configuration of the lever mechanisms of a bicycle propelling device according to an embodiment of the present invention.
Figure 3:
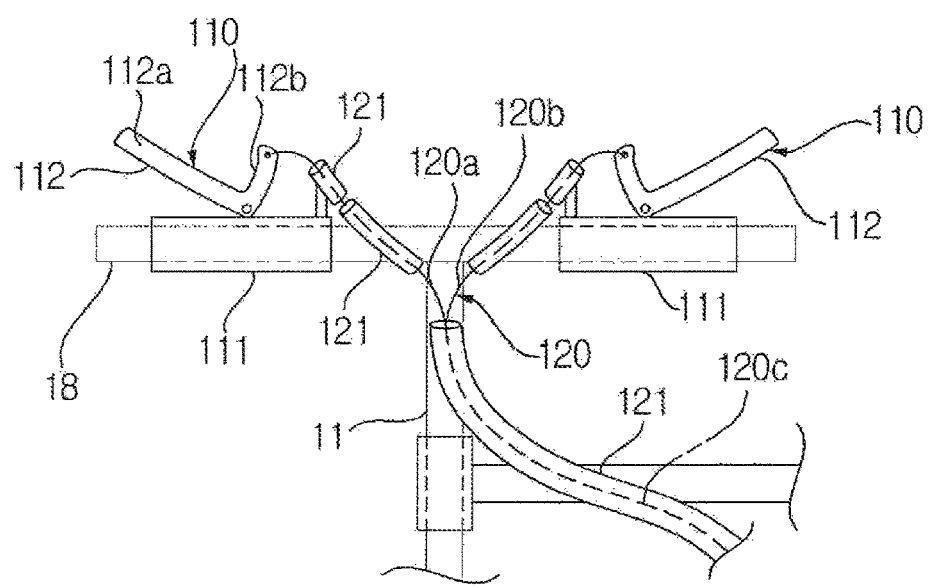
FIG. 3 is a view showing the configuration of the lever mechanisms of a bicycle propelling device according to another embodiment of the present invention.
Figure 4:
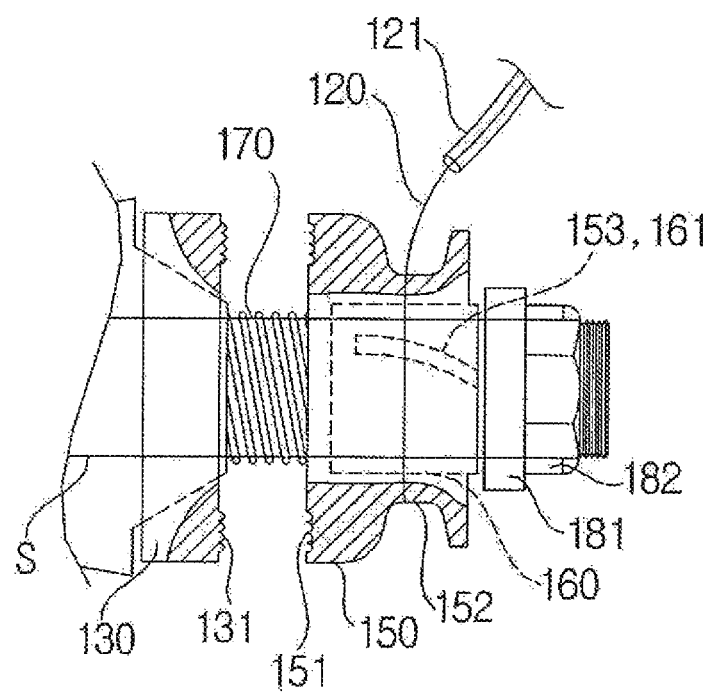
FIG. 4 is a view showing the configuration of the wheel shaft part of a bicycle propelling device according to an embodiment of the present invention.

FIG. 1 is a schematic diagram showing a bicycle equipped with a propelling device according to an embodiment of the present invention, FIGS. 2 and 3 are views showing the configurations of the lever mechanisms of bicycle propelling devices according to an embodiment and another embodiment of the present invention, and FIG. 4 is a view showing the configuration of the wheel shaft part of a bicycle propelling device according to an embodiment of the present invention.

As shown in FIG. 2, the bicycle 10 equipped with a propelling device 100 includes a frame 11, a front wheel 12 and a rear wheel 13 disposed on both sides of the frame 11, and pedals 14 disposed on the center portion of the frame 11. The bicycle 10 further includes sprockets 15a and 15b disposed on a rear wheel shaft and a pedal shaft, respectively, and a chain 16 configured to connect the sprockets 15a and 15b on both sides as a power transmission means configured to transfer the pedal force of the pedals 14 to a rear wheel 13. The bicycle 10 further includes a saddle 17 and a handle that are disposed on the frame 11.

The propelling device 100 is disposed between the handle and the wheel shaft S, and includes a support rod 18, lever mechanisms 110, strings 120, and a free wheel 130 having a ratchet mechanism 140 therein. Although the present invention may be basically practiced using a structure including the lever mechanisms 110, the strings 120, and the free wheel 130 having the ratchet mechanism 140 contained therein, a structure further including a mediation member 150, a connection member 160, and a spring 170 is described as an example in an embodiment of the present invention.

Furthermore, the free wheel 130 having the ratchet mechanism 140 contained therein according to the present invention may be selectively disposed in one of the wheel shafts S of the front and rear wheels 12 and 13, or may be disposed in each of the wheel shafts S of the front and rear wheels 12 and 13. The embodiment of the present invention will be described based on a structure in which the free wheel 130 having the ratchet mechanism 140 contained therein, the mediation member 150, the connection member 160 such as a bearing or the like, and the elastic member 170 such as a spring or the like are disposed in the wheel shaft S of the rear wheel 13.

The support rod 18 is a rod-shaped structure, and is a component configured to support the thumbs or remaining fingers exclusive of the thumbs so that the hands exert gripping force. As shown in FIG. 2, in a preferred embodiment of the present invention, the handle of a bicycle is configured to be the support rod. The support rod 18 may be configured to be separate from the handle and attached and used onto a component of the bicycle adjacent to the handle.

The lever mechanisms 110 are devices configured to pull the strings. The preferred embodiment of the present invention includes propulsion operation levers 112, and may further include rotating elements 111. The rotating elements 111 are rotatably disposed on the support rod 18. The propulsion operation levers 112 are hinged to the support rod 18 or rotating elements 111. The propulsion operation levers 112 are operated by gripping force, i.e., the holding force of the hands, and the rotating elements 111 are operated by the force used to twist the wrists. The operation levers located on the support rod include a pair of operation levers on left and right sides because the gripping force of both hands is used, and the pair of lever mechanisms are connected to the strings and transfer power such that the wheels of the bicycle are rotated. When both the propulsion operation levers 112 and the rotating elements 111 are disposed, operation is performed using gripping force and force used to twist the wrists. Brake operation levers configured to operate a brake and used in a conventional bicycle are not shown in FIGS. 2 and 3, and the brake operation levers are disposed on the rotating elements or both sides of the handle along with the propulsion operation levers. FIG. 2 illustrates a structure in which the propulsion operation levers 112 are disposed on both sides of the handle, and FIG. 3 illustrates a structure in which both the propulsion operation levers 112 and the rotating elements 111 are disposed on both sides of the handle. The lever mechanisms 110 may include the rotating elements 111 or propulsion operation levers 112, or may include both the rotating elements 111 and the propulsion operation levers 112. Furthermore, the lever mechanisms may be configured using various devices capable of pulling the strings, other than the propulsion operation levers or rotating elements.

The rotating elements 111 are cylindrical members configured to be fitted over the support rod and rotated, are disposed on the support rod, and function to pull the strings 120 by using force used to twist the wrists. Elastic members configured to restore the rotating elements 111 to their original locations when the rotating elements 111 are not operated, such as torsion springs, may be coupled to the insides of the rotating elements 111. The length to which the strings are pulled is determined by the maximum rotation angle of the rotating elements 111.

The propulsion operation levers 112 are configured in the form of levers hinged to the support rod 18. The first ends of the propulsion operation levers are spaced apart from and face the support rod, and the second ends of the propulsion operation levers are connected to the strings. As the first ends of the propulsion operation levers become closer to the support rod, the strings are pulled. In an embodiment of the present invention, a user generates the gripping force of the hands by pulling the propulsion operation levers 112 with the thumbs in the state of supporting the index, middle, ring and little fingers on the support rod 18.

Meanwhile, although the propulsion operation levers 112 are hinged to the rotating elements 111 in the other embodiment, the propulsion operation levers 112 may be spaced apart from and face the support rod in the same manner.

In this case, the propulsion operation levers 112 function to pull the strings 120 by using the gripping force of the hands. Each of the propulsion operation levers 112 includes a holding portion 112a configured to be gripped with the hand and a string connection portion 112b configured such that a corresponding one of the strings 120 is connected thereto. The length to which the string is pulled varies depending on the lengths, ratio, size and shapes of the holding portion 112a and the string connection portion 112b.

The portion where the holding portion 112a and the string connection portion 112b meet each other is a hinge portion that is hinged to a corresponding one of the rotating elements 111. An elastic member configured to restore the propulsion operation lever 112 to its original location when the propulsion operation lever 112 is not operated, such as a torsion spring, may be coupled to the hinge portion.

The length to which the string 120 is pulled is determined depending on the length ratio, sizes, and shapes of the parts of the handle 18 in the state in which the holding portion 112a is free. This is added to the rotation of the rotating element 120, and the sum determines the length to which the string 120 is maximally pulled.

The strings 120 are pulling strings in which the two strings 120a and 120b connected to the string connection portions 112b in the lever mechanisms 110 on both sides of the handle are combined into a single string 120c and connected to the free wheel 130 disposed on the wheel shaft S or to the mediation member 150. Accordingly, even when only the lever mechanism 110 on one side of the handle is operated, operating force is transferred to the wheel shaft S. The reason that the two strings connected to the propulsion operation levers 112 located on both sides of the handle are integrated into the single string is to maximize propelling power by using both the forces of both hands. Accordingly, although the point at which the two strings are integrated into the string may be a portion on the strings, it may be the mediation member or free wheel, or the two strings may be simultaneously connected to the mediation member or free wheel.

Although the strings 120 refer to metal wires, they broadly include fiber cables, strings made of synthetic resin, and strings made of another material, formed in slender, lengthy shapes, and configured to connect individual entities. The strings 120 are guided through a plurality of guide tubes 121 disposed on the handle 18 and the frame 11 and connected to the free wheel 130 or mediation member 150.

The free wheel 130 is a mechanism that transfers power to the wheel in one rotation direction when the strings 120 are pulled, is fastened to a side surface of the wheel, and is rotatably disposed on the wheel shaft S. An engagement portion 131 configured such that the mediation member 140 is caught thereon is formed on the outer surface (the opposite side surface of the wheel) of the free wheel 130. The engagement portion 131 has a structure in which teeth, gears, square depressions and protrusions, arcuate depressions and protrusions, or thread-shaped tooth are formed in the circumferential direction. The free wheel is not limited to the above shape, but may have various shapes that transfer power only when rotation is performed in one direction but do not transfer power when rotation is performed in the opposite direction. In other words, the free wheel includes other types of mechanical devices using a clutch bearing or ratchet, and other various types of devices. In this case, the free wheel is required to prevent the running of the bicycle from being obstructed by pulling the strings when the pedals are pressed or the bicycle runs down an inclined road.

As shown in FIG. 4, the ratchet mechanism 140 is a mechanism that is located inside free wheel 130, is disposed on the wheel shaft S, and rotates the wheel shaft S only in one direction as the free wheel 130 is rotated. The ratchet mechanism 140 includes a ratchet tooth portion 141 formed on the inner surface of the free wheel 130, a pawl 142 configured to be caught on the teeth of the ratchet tooth portion 141 and to transfer rotating force only in one direction, a latch plate 143 configured such that the pawl 142 is hinged thereto and fastened to the wheel shaft S, and a leaf spring 144 configured to be interposed between the latch plate 143 and the pawl 142 and to exert elastic force onto the pawl 142.

In FIG. 4, when the free wheel 130 is rotated in a counterclockwise direction, rotating force is transferred to the wheel shaft S through the pawl 142 and the latch plate 143, and thus the wheel is rotated. When the free wheel 130 is rotated in a clockwise direction, the rotating force of the free wheel 130 is not transferred to the wheel, and thus idle running is performed.

The mediation member 150 that is coupled to the free wheel 130 is disposed on the wheel shaft S, and the string 120 is connected to the mediation member 150. As the strings 120 are pulled, the mediation member 150 moves horizontally while being rotated and is coupled to the free wheel 130. When the strings 120 are not pulled, the mediation member 150 is placed at its original location. A counterpart engagement portion 151 that is engaged with the engagement portion 131 of the free wheel 130 is formed on the outer surface (the free wheel-side surface) of the mediation member 150. The counterpart engagement portion 151 has a structure in which teeth, gears, square depressions and protrusions, arcuate depressions and protrusions, or thread-shaped tooth are formed in the circumferential direction. A groove strip 152 configured such that the string 120 is selectively wound and unwound therein is formed on the outer circumferential surface of the mediation member 150.

Furthermore, the connection member 160 in which the spiral portion 161 composed of a spiral protrusion or spiral groove is formed is rotatably fastened on the wheel shaft S, and a counterpart spiral portion 153 composed of a counterpart spiral groove or counterpart spiral protrusion and configured to be fitted into the spiral portion 161 is formed on the inner surface of the mediation member 150. The connection member 160 is located on the inner side of the mediation member 150. Furthermore, the spring 170 (the elastic member) configured to restore the mediation member 150 is inserted over the wheel shaft S between the free wheel 130 and the mediation member 150. Furthermore, although not shown in the drawings, the elastic member 170, such as a spring, may be further disposed on the connection member in order to help restoration.

Meanwhile, the mediation member 150 may be configured in a structure in which it is coupled to the free wheel 130 by the elastic member in normal times and is horizontally moved by the operation of the levers and separated from the free wheel 130 during backward movement. In this case, the elastic member (spring) 170 is disposed on the mediation member 150, and imparts coupling force that couples the mediation member 150 to the free wheel 130 in normal times.

A nut 182 is fastened at an end of the wheel shaft S through the medium of a ring member 181 in order to prevent the mediation member 150 from being separated.

In the bicycle 10 equipped with the propelling device 100 according to the embodiment of the present invention, which is configured as described above, when a user grips the propulsion operation levers 112 or grips the propulsion operation levers 112 and twists his or her wrists to rotate the rotating elements 111 while holding the handle 18 and the propulsion operation levers 112 with his or her hands during ascending driving on an inclined road or acceleration driving, the string 120 connected to the mediation member 150 through the guide tube 121 is pulled.

When the string 120 is pulled, the mediation member 150 is rotated, and the counterpart spiral portion 153 is engaged with the spiral portion 161 of the connection member 160 and horizontally moved toward the free wheel 130 along the wheel shaft S. When the counterpart engagement portion 151 of the horizontally moved mediation member 150 is engaged with the engagement portion 131 of the free wheel 130 and the string 120 is further pulled, the free wheel 130 is rotated in a counterclockwise direction as shown in FIG. 4, and rotating force is transferred to the wheel shaft S through the medium of the pawl 142 and the latch plate 143, thereby providing additional propelling force to the wheel.

When hand gripping force or wrist twisting force is not applied to the propulsion operation levers 112 and the rotating elements 111, the mediation member 150 of the free wheel 130 is separated by the restoring force of the elastic member 170, and the mediation member 150 is placed at its original location.

The elastic member may be located at each of various locations.

The elastic member, such as the spring, is intended apply elastic force so that the string pulled by gripping force or wrist twisting force is returned to its original location and easily performs repeated power transfer. When the string is pulled by the elastic member, the propulsion operation levers 112 or rotating elements 111 to which the strings are connected, or the propulsion operation levers 112 and the rotating elements 111 in the case where both the propulsion operation lever 112 and the rotating element 111 are disposed are pulled and placed at their original locations, thereby enabling gripping force or wrist twisting force to be easily and repetitively used. The elastic member may be used in combination with the mediation member 150, the free wheel 130, the string 120, the propulsion operation levers 112, or the rotating element 111, and may be used in combination with various other places.

When the string pulled by propelling force, such as hand gripping force or wrist twisting force, is automatically returned to its original location by the elastic force of the elastic member when the propelling force is removed, this also returns the propulsion operation levers, the rotating elements, and the mediation member to their original locations, thereby enabling propelling force to be easily and repetitively used.

As force is repetitively applied to the propulsion operation levers 112 and the rotating elements 110, additional propelling force may be applied to the front or rear wheel.

Figure 5:
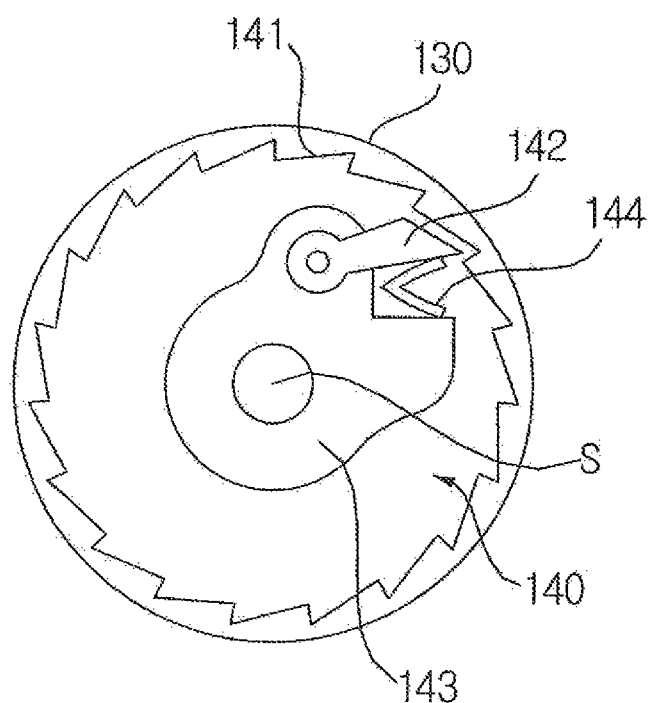
FIG. 5 is a view showing the configuration of the free wheel of a bicycle propelling device according to an embodiment of the present invention.
Figure 6:
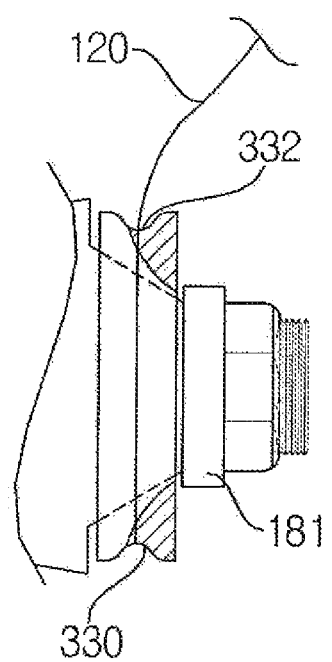
FIG. 6 is a view showing the configuration of the wheel shaft part of a bicycle propelling device according to still another embodiment of the present invention.

FIG. 6 is a view showing the configuration of the wheel shaft part of a bicycle propelling device according to still another embodiment of the present invention. The embodiment of FIG. 6 has a structure in which the free wheel 330 of FIG. 5 is rotatably disposed on the wheel shaft S without the mediation member 150 and connection member 160 of FIG. 4. The embodiment of FIG. 6 has a limitation to backward driving because the string is directly connected to the free wheel fastened to the wheel without the mediation member. However, the bicycle does not frequently require backward driving, and has an advantage in that the manufacturing thereof is easy.

In the embodiment of FIG. 6, the groove strip 332 configured such that the string 120 is selectively wound and unwound therein is formed in the outer circumferential surface of the free wheel 330. The elastic member 170, such as a spring, configured to place the free wheel 330 at its original location when the string 120 is not pulled may be provided on the free wheel 330 or string 120.

Meanwhile, the embodiments of the present invention disclosed in the present specification and drawings are intended merely to present specific examples to easily describe the technical content of the present invention and help the understanding of the present invention, but are not intended to limit the scope of the present invention. It will be apparent to those having ordinary skill in the art to which the present invention pertains that other modifications based on the technical spirit of the present invention may be practiced in addition to the embodiments disclosed herein.

The invention claimed is:

1. A bicycle propelling device, the bicycle propelling device being disposed on a bicycle including a support rod, the bicycle propelling device comprising:
   strings configured to be pulled by lever mechanisms; and
   a free wheel configured to transfer power to a wheel only in one rotation direction as the strings are pulled;
   wherein the lever mechanisms include a pair of lever mechanisms on left and right sides of the support rod, and the pair of lever mechanisms are connected to the strings, respectively; and
   wherein one or more elastic members configured to return the lever mechanisms and the strings to their original states when force is not applied to the lever mechanisms are provided, and an operation in which the strings are pulled when force is applied to the lever mechanisms and are returned to their original locations by the elastic members when force is removed is repeated.

2. A bicycle propelling device comprising:
   a support rod;
   strings configured to be pulled by lever mechanisms; and
   a free wheel configured to transfer power to a wheel only in one rotation direction as the strings are pulled;
   wherein the lever mechanisms are propulsion operation levers hinged to the support rod, first ends of the propulsion operation levers are spaced apart from and face the support rod so that they can be held by hands, remaining ends of the propulsion operation levers are connected to the strings, and the strings are pulled as the first ends of the propulsion operation lever are brought close to the support rod.

3. A bicycle propelling device comprising:
   a support rod;
   strings configured to be pulled by lever mechanisms; and
   a free wheel configured to transfer power to a wheel only in one rotation direction as the strings are pulled;
   wherein the lever mechanisms are propulsion operation levers hinged to the support rod, first ends of the propulsion operation levers are spaced apart from and face the support rod so that they can be held by hands, remaining ends of the propulsion operation levers are connected to the strings, and the strings are pulled as the first ends of the propulsion operation lever are brought close to the support rod; and
   wherein one or more elastic members configured to return the lever mechanisms and the strings to their original states when force is not applied to the lever mechanisms are provided, and an operation in which the strings are pulled when force is applied to the lever mechanisms and are returned to their original locations by the elastic members when force is removed is repeated.

4. A bicycle propelling device comprising:
   a support rod;
   strings configured to be pulled by lever mechanisms, wherein the lever mechanisms include a pair of lever mechanisms on left and right sides of the support rod, and the pair of lever mechanisms are connected to the strings, respectively; and
   a free wheel configured to transfer power to a wheel only in one rotation direction as the strings are pulled;
   wherein each of the lever mechanisms includes a rotating element formed as a cylindrical member that is inserted into the support rod and is rotated and a propulsion operation lever hinged to the rotating element, first ends of the propulsion operation levers are spaced apart from and face the support rod so that they can be held by hands, and remaining ends of the propulsion operation levers are connected to the strings.

5. The bicycle propelling device of claim 1, wherein each of the lever mechanisms and the support rods are provided on both left and right sides of a bicycle handle, first ends of the strings are connected to the lever mechanisms, respectively, and remaining ends of the strings are connected to the free wheel.

6. The bicycle propelling device of claim 1, wherein a mediation member connected to the strings and configured to move horizontally and to be then engaged with or separated from the free wheel is disposed on a wheel shaft.

7. The bicycle propelling device of claim 2, wherein each of the lever mechanisms and the support rods are provided on both left and right sides of a bicycle handle, first ends of the strings are connected to the lever mechanisms, respectively, and remaining ends of the strings are connected to the free wheel.

8. The bicycle propelling device of claim 3, wherein each of the lever mechanisms and the support rods are provided on both left and right sides of a bicycle handle, first ends of the strings are connected to the lever mechanisms, respectively, and remaining ends of the strings are connected to the free wheel.

9. The bicycle propelling device of claim 2, wherein a mediation member connected to the strings and configured to move horizontally and to be then engaged with or separated from the free wheel is disposed on a wheel shaft.

10. The bicycle propelling device of claim 3, wherein a mediation member connected to the strings and configured to move horizontally and to be then engaged with or separated from the free wheel is disposed on a wheel shaft.

\* \* \* \* \*